(12) United States Patent
Lombardo et al.

(10) Patent No.: US 6,341,290 B1
(45) Date of Patent: Jan. 22, 2002

(54) METHOD AND SYSTEM FOR AUTOMATING THE COMMUNICATION OF BUSINESS INFORMATION

(75) Inventors: Charlotte S. Lombardo, Rochester Hills; Eleanor F. Stryker, Romeo, both of MI (US); David A. Brenner, Lenexa, KS (US); Jayson W. Dymond, Orion; Dave R. Lemieux, Sterling Heights, both of MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/322,707

(22) Filed: May 28, 1999

(51) Int. Cl.⁷ .............................................. G06F 17/30
(52) U.S. Cl. ...................... 707/104.1; 707/10; 707/102; 707/515
(58) Field of Search .................... 707/104, 10, 102, 707/515; 705/10, 26, 27, 35, 1

(56) References Cited

U.S. PATENT DOCUMENTS

| | | | |
|---|---|---|---|
| 6,078,924 A | * 6/2000 | Ainsbury et al. | 707/101 |
| 6,128,624 A | * 10/2000 | Papierniak et al. | 707/104 |
| 6,151,584 A | * 11/2000 | Papierniak et al. | 705/10 |
| 6,192,381 B1 | * 2/2001 | Stiegemeier et al. | 707/505 |
| 6,199,106 B1 | * 3/2001 | Shaw et al. | 709/217 |
| 6,237,011 B1 | * 5/2001 | Ferguson et al. | 707/515 |

* cited by examiner

*Primary Examiner*—John Breene
*Assistant Examiner*—Debbie M Le
(74) *Attorney, Agent, or Firm*—Baker Botts LLP (57) ABSTRACT

One aspect of the invention is a system for automating the communication of business information. The system comprises a server (20) operable to capture business information from a plurality of sources, capture distribution information associated with the business information, integrate the captured information in a standardized format, and display the captured information. The system also comprises a database (40) operable to communicate with the server (20). The database (40) is operable to store the captured information and communicate the captured information to the server (20).

63 Claims, 8 Drawing Sheets

METHOD AND SYSTEM FOR AUTOMATING THE COMMUNICATION OF BUSINESS INFORMATION

TECHNICAL FIELD OF THE INVENTION

This invention relates generally to a field of computer software systems, and more particularly, to a system and method for automating the communication of business information.

BACKGROUND OF THE INVENTION

Large and globally-based organizations that require communication of consistent information in all aspects of the operation of the organization face significant challenges, especially for those organizations that are geographically dispersed and functionally heterogeneous. Such information is generally required as part of an organization's operation, but communicating consistent information on a timely basis has typically been an area where much human interaction is required.

In most organizations such information is captured from a variety of sources by using inter-office mail, e-mail, postal services, telephones, fax machines, computer applications, and individual databases. Although these known methods provide substantial value generally, communication on such a global scale compounds potential problems with automating and ensuring consistency of these communications. For example, points of communication within the organization must be able to send and to receive using the same technical capabilities. Often, the same piece of information must be transmitted using multiple communication vehicles for all recipients in that organization to access the information.

Posting to a server such as a FTP (file transfer protocol) server located on the Internet may provide a partial solution to automating and ensuring consistency of some communications. But such a solution ensures only temporary consistency, and suffers from the disadvantages that FTP server may only display such information as the file name and attributes of these communications, rather than the file contents. Further, information would still need to be managed from multiple locations, such as multiple FTP servers. In addition, such disparate means for communications provides no standardization of information regarding, for example, people and projects within the organizations.

Each of these known methods may also suffer from additional disadvantages when used together. For example, most such information sources use non-standard formats that require time to transfer, convert, and manipulate crucial data. Telephones and hard copy distribution often experience delivery delays, pose a security risk if not delivered properly, and are not easily revised. Electronic mail is plagued by frequent delivery delays (especially when sending mail out of the country) and file compatibility problems. Additionally, mail servers may limit attachment file sizes to avoid overburdening the server. Individual databases suffer from potential problems of redundant and stale information that may be generally resolved by using a common receptacle for shared data.

SUMMARY OF THE INVENTION

Thus, it is desirable to provide a system and method for automating the communication of business information across an entire organization that streamlines the communication of the information from a variety of sources to their respective recipients.

One aspect of the invention is a method for automating the organization of business information that first captures business information from a plurality of sources. Distribution information associated with the business information is also captured. Next, the captured business and distribution information is integrated into a standardized format. Last, the captured information is stored in a database.

In one embodiment of the present invention, a method is disclosed for automating the use of business information comprising of two steps. In the first step, at least a portion of captured information is requested. The captured information is received from a plurality of sources and stored in the database. The captured information is further integrated into a standardized format for access and use by the server and comprises business information and distribution information associated with the business information. In the second step, the portion of captured information is received at a server.

In another embodiment of the present invention, a method is disclosed for automating the use of business information comprising two steps. In the first step, at least a portion of captured information is requested. In the second step, the portion of captured information is accessed from a database residing on a server. The captured information is received from a plurality of sources and stored in the database. The captured information is further integrated into a standardized format for access and use by the server and comprises business information and distribution information associated with the business information.

In a further embodiment of the present invention, a system for automating the communication of business information is disclosed. The system comprises a server operable to capture business information from a plurality of sources, capture distribution information associated with the business information, categorize the captured information in a standardized format, and display the captured information. The system also comprises a database operable to communicate with the server. The database is operable to store the captured information and communicate the captured information to the server.

In yet another embodiment of the present invention, a method is disclosed for automating the communication of business information comprising two steps. The first step comprises querying a database over the internet for a hierarchically-limited portion of captured information. The captured information comprises business information categorized with distribution information in a standardized format. The second step comprises displaying the hierarchically-limited portion of the captured information in the standardized format.

Another embodiment of the present invention discloses a system for automating the communication of business information. The system comprises a database operable to communicate with the internet. The database is further operable to store business information captured from a plurality of sources and distribution information associated with the business information, and communicate the captured information to the internet. The system also comprises a server operable to communicate with the database over the internet. The server is also operable to categorize the captured information in a standardized format, query the database for a hierarchically-limited portion of the captured information, and display the hierarchically-limited portion of the captured information in the standardized format.

One technical advantage of the present invention is the ability to automate capturing and storaging business information into a standardized format. The present invention simultaneously manages the receipt and communication of business information from a variety of sources to users in an organization requiring such business information.

Another technical advantage of the present invention is that such a system and method increases the productivity of an organization. Yet another technical advantage of the present invention is that such a system and method improves the consistency and persistence of captured business information across an organization. Such a system and method can also reduce the amount of redundant and/or expired data across an organization, thereby reducing resource requirements such as storage space. Another technical advantage is that it provides an efficient and timely method and system for data mining over the internet.

Other technical advantages should be apparent to one of ordinary skill in the art in view of the specification, drawings, and claims.

BRIEF DESCRIPTION OF THE DRAWINGS

For a better understanding of the present invention, the objects and advantages thereof, reference may be made to the accompanying drawings, in which.

DETAILED DESCRIPTION OF THE DRAWINGS

The embodiments of the present invention and its advantages are best understood by referring to FIGS. 1A through 13 of the drawings, like numerals being used for like and corresponding parts of the various drawings.

Figure 1A:
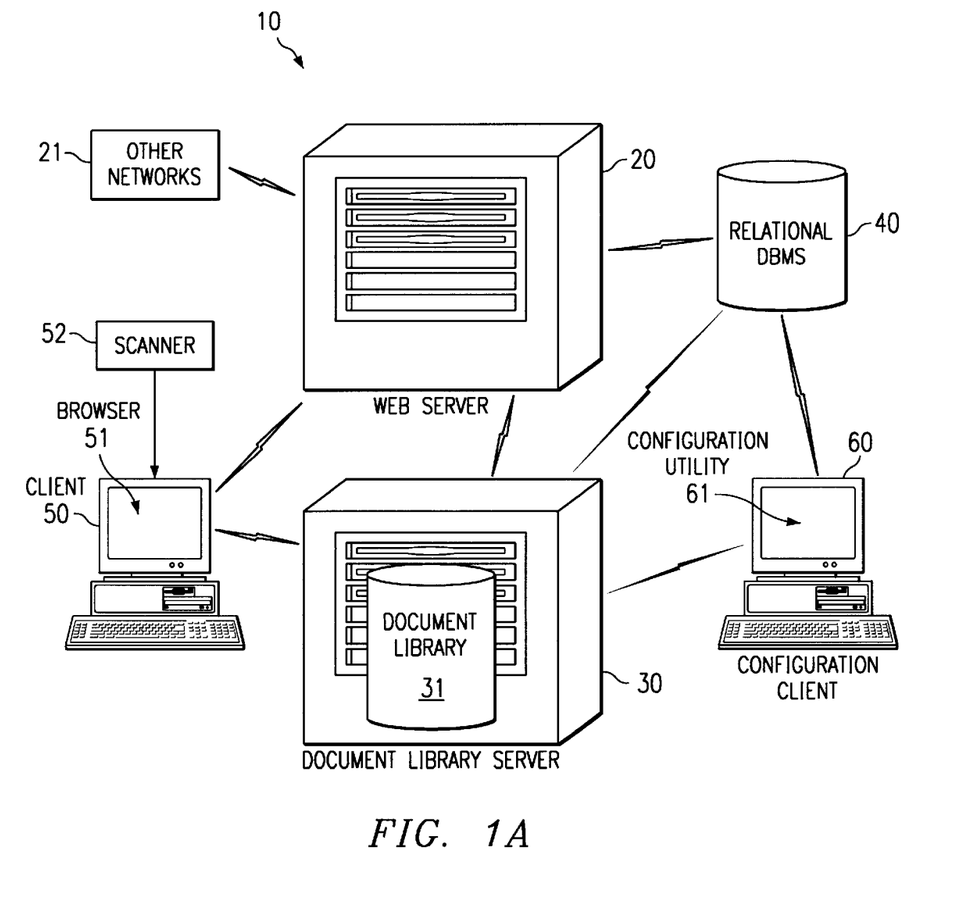
FIG. 1A is a top-level system block diagram of an embodiment of the present invention.

Referring to FIG. 1A, a block diagram of an embodiment of the system and method 10 for automating business information of the present invention is shown. System 10 includes a web server 20, document library server 30 and document library 31, database 40, and configuration client 60, each operable to communicate or otherwise exchange information with one another. System 10 is also operable to communicate and otherwise transmit and receive information with one or many client platforms or clients 50, each hosting a browser 51. System 10 may utilize any suitable network protocol and logical or functional configuration, including wireless technologies. It is within the scope of the invention for system 10 to be web-based, and also may be used entirely within an organization on an intranet.

In one embodiment of the present invention, web server 20 may be a Netscape Enterprise® Server, hosted on a UNIX operating system. Web server 20 (hereinafter referred to as "server 20") may be any server having a suitable operating system operable to support suitable applications that support static or dynamic web pages. For example, server 20 may host Netscape's LiveWire® application server, which is operable to run and support JavaScript and Java applications and utilities. Any suitable configuration for such software may be used. For example, LiveWire® supports the use of JavaScript and Java, but other languages and HTML (hypertext markup language) extensions that support and facilitate the use of dynamic web pages may also be used. Examples include Microsoft Active Server Pages (ASP), Common Gateway Interface (CGI), Interface Server Application Programming Interface (ISAPI), Active X, and Cold Fusion. These utilities facilitate communications between system 10 and clients 50. Such utilities may capture documents from standard word processing, spreadsheet and presentation programs such as Microsoft's Word, Excel, and Powerpoint. These utilities are also operable to capture data and to perform such functions as are found in typical electronic mail (email) and contacts management packages such as Symantec's Act. This process is discussed in further detail in conjunction with FIG. 1B. Server 20 is generally operable to capture information, including information communicated from clients 50, configuration client 60, and other networks 21. Server 20 is also operable to integrate and to display the captured information to be used in a standardized format.

One or more clients 50 may be used to access, update, view, and retrieve information captured in system 10. Server 20 and document library server 30 are accessible to client 50 by any suitable networking means, for example dialing up through an Internet service provider to the World Wide Web. Client 50 is generally operable to access and display captured information. Client 50 is primarily used by a variety of authorized users, which typically include all members of an organization. Client 50 may be any suitable platform that hosts Windows, Windows NT, UNIX, Macintosh or similar operating systems that support the use of email and any standard browser 51. Generally, the user utilizes a browser 51, such as Netscape Navigator or Internet Explorer, to access and display the captured information in system 10 through server 20 or document library server 30. Client 50 can also receive captured information in system 10 using any email functionality. In some applications, a client 50 with sufficient capacity may also serve as server 20, thus obviating the need for a separate server 20. In such an embodiment, client 50 is also operable to communicate directly with database 40.

Database 40 is accessible by server 20, document library 31, document library server 30, and configuration client 60. Database 40 is generally operable to store business and distribution information captured by system 10 as used in the present invention. Any suitable database schemes may be used for database 40, including relational databases, object-oriented databases, or object-relational databases. Database 40 may reside on its own server or on server 20. In one embodiment, database 40 may be an Oracle relational database management system hosted on a UNIX server. Although in this embodiment, database 40 and document library 31 are separate entities residing on separate servers, it is within the scope of the invention for database 40 to incorporate such document management functionality. The need to have a separate document library is then obviated.

System 10 also comprises a document library server 30, which hosts document library 31. In one embodiment, document management is performed by using Lotus Domino and Lotus Domino.doc. Such a document library configuration supports network access to a plurality of users, version control, check-in and check-out of documents to ensure document integrity, and has the capacity to handle large numbers of documents. Access to database library 31 is controlled by a document management application that processes a user's requests. The application also prompts the user for information to assist in categorizing a document upon creation. In this embodiment, database 40 stores a uniform resource locator (URL) address for documents stored in document library 31, and other information associated with such documents. Any such suitable document library may be used. System 10 may also be configured in any suitable manner to support such a library. For example, document library 31 may also be hosted on server 20. Document library 31 may also be integrated into database 40, instead of existing as a separate function or application.

In this embodiment, configuration client 60 is operable to communicate with database 40 and document management server 30. Configuration client 60 hosts configuration utility 61 on a suitable operating system, such as Microsoft Windows and Windows NT. More specifically, configuration utility 61 may comprise a set of browser-based executable utility applications that are interpreted as needed by any suitable browser application. Client 60 and configuration utility 61 may be suitably configured to support system 10. For example, configuration utility 61 may be hosted on server 20, as HTML or Java-enabled web pages, thus obviating the need for a separate configuration client 60.

Configuration utility 61 generally facilitates creating new information to be captured into system 10. Typical examples of such new information include passwords, users, projects, and organizations. Configuration utility 61 is primarily used by users who have appropriate authorization to access and update new information. Security authorization schemes that govern proper authorization to access systems are known to those skilled in the art. Thus, system 10 may use any suitable method for providing a number of security levels (e.g., system-wide, organization-wide, project-wide) for controlling access.

System 10 is generally internetwork-based and operable to capture business information and distribution information, and to integrate such information into a standardized format that may be used to display dynamic web pages. This standardized format streamlines the communication, updating and retrieval of information among authorized users of system 10, and is discussed in conjunction with FIGS. 1B and 1C.

Figures 1B, 1C:
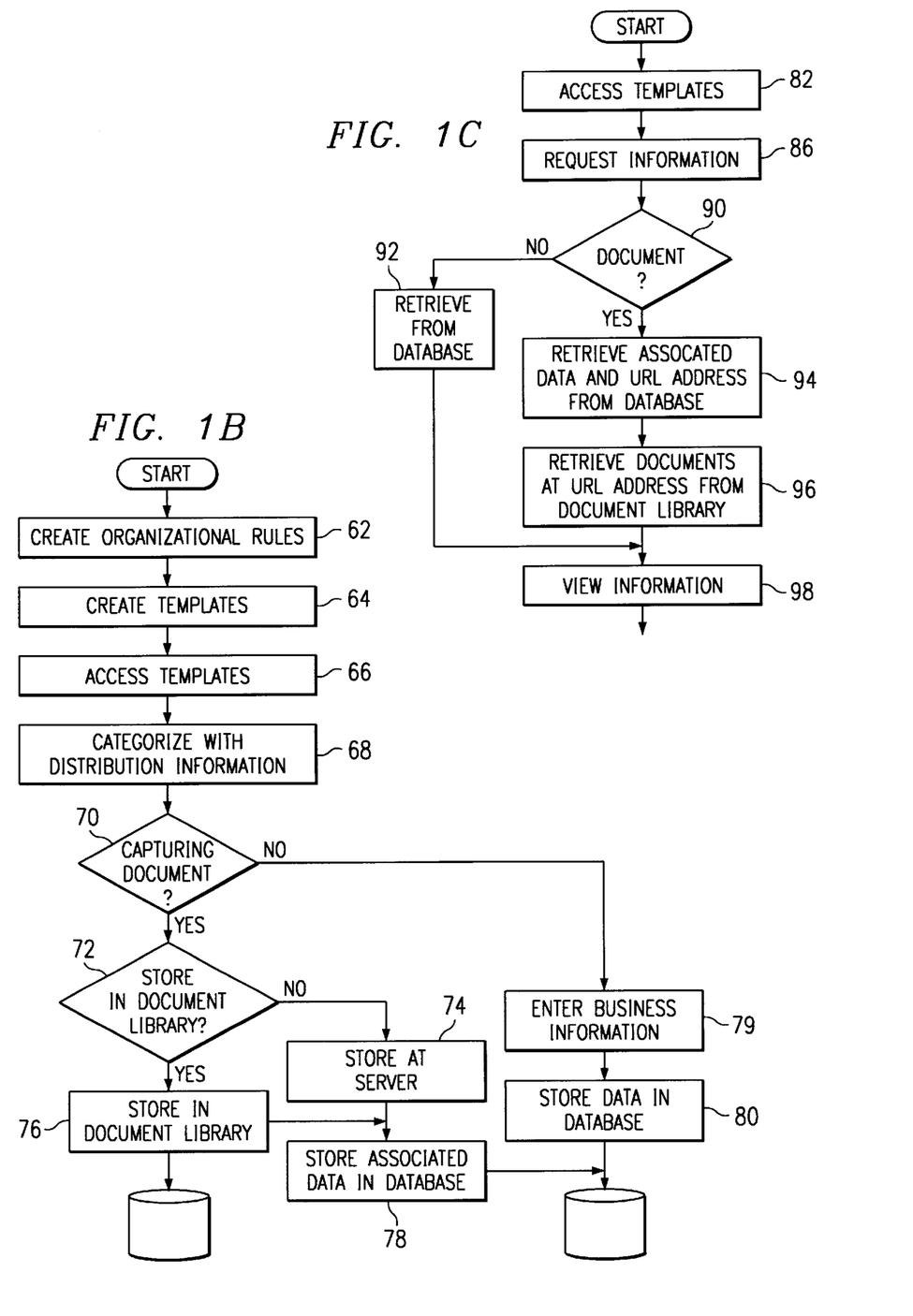
FIG. 1B is an exemplary flowchart of an embodiment of capturing information into the system of the present invention.
FIG. 1C is an exemplary flowchart of an embodiment of a process for accessing information captured in the system of the present invention.

FIG. 1B is an exemplary flowchart of an embodiment of a process for capturing information into the system of the present invention. In general, business information captured by system 10 may include business documents and communications, project, organizational, geographical and biographical data, interpersonal communications and news. Distribution information is associated with the business information, and typically includes relationships between project, biographical information, and geographic information associated with every person in the organization. In short, such business and distribution information includes any type of data encountered in operating a business today. People throughout an organization require timely and accurate access to this variety of information.

For example, management personnel require the ability to view information regarding project teams to make informed decisions regarding assignments and project scheduling. Executive management needs cost, scheduling, and personnel data in order to make business decisions. Project team members require technical, scheduling, and project data in order to perform tasks. Historically, these data may be communicated using different media, including email, facsimile, spreadsheet, memos, and project scheduling software.

In step 62 of the information capture process, an authorized user such as a system administrator on configuration client 60 creates rules to provide a standardized format for an organization. Such a standardized format provides a structure to tie together business information created by a variety of business tools. Such a structure includes categorization of such business information by distribution information. This structure thus provides a means for creating, prioritizing, distributing, reporting, maintaining and managing global organizational information for the people who require such information.

The user may then create customized templates in step 64 using the standardized format that facilitate both the entry of new information to be captured in system 10 as well as the access of the information. Typically, such a template used to facilitate entry of information can be displayed to the user in a list, form, or entry line for the user to select or enter in information which minimize the amount of information a user need digest and change. Templates can be used to access the information display relevant fields of requested information to the user. Templates using various programming technologies such as Java or HTML may also support dynamic updates, or direct data access. These templates allow users to mine database 40 or document library 31 directly. For example, documents may be directly retrieved from document library 31 by means of hyperlinks embedded in a web page. When the user clicks on a hyperlink, the document is retrieved directly from document library 31. Such templates may also be used in a document management tool associated with document library 31. The presentation, storage and indexing of the business information into such templates may be configured to particular organizational needs.

At step 66, any authorized user may access the templates. Such templates may guide or prompt the user to enter a proper request, or give the user the ability to scroll or scan through lists of certain information, such as names of people in an organization. Use of such standard templates may also perform on the fly spell checking, or display to the user the nearest captured information to that entered by the user. Such templates also preserve format and consistency of the information in system 10. Program utilities residing on server 20 then capture and integrate business information in this embodiment into these templates.

At step 68, utilities residing on server 20 categorize the business information to be entered. Thus, for example, the user is displayed a list, form, or entry line that prompts the user to enter in information to be associated with the project, such as the associated project, person's name, category and document title. Typically, such a display may also provide the user an opportunity to identify key words in the document content and may be used to extract information from, or retrieve the document.

Step 70 determines where the business information is to be stored. It is within the scope of the invention for this determination to be made by a user or system administrator, or by system 10. If the business information is not a document, the user enters the business information at step 79, which is then uploaded to database 40 for storage therein at step 80. On the other hand, should the business information be a document, system 10 then queries at step 72 whether this particular document should be stored in document library 31. It may be advantageous in some situations to store certain documents, such as graphics or scanned images, in database 40, rather than in document library 31. Such information also may include "tooling up" reports, which indicate or request users to report progress on projects. In these situations, system 10 uploads and stores the business information to server 20 for storage therein in step 74.

As an example, a user using browser 51 on client platform 50 may scan an image to accompany his biographical information using client 50, and enter information to be associated with the digitized image using browser 51. Such information is then captured and integrated by server 20, and stored in database 40. These operations generally appear seamless to users.

System 10 then stores associated data with the business information in database 40 at step 78. Such associated data includes, for example, a link in database 40 to the file location of the business information on server 20. Such a file location may be a URL address. On the other hand, if the business information is to be stored in document library 31, system 10 uploads the business information to document library server 30 for storage in document library 31, at step 76. Again, system 10 then stores associated data with the business information in database 40 at step 78. In this situation, such associated data includes a link to an appropriate URL address in document library 31. Such an appropriate URL address may include, for example, the location of a project, or the location of the document itself.

In this embodiment, such means of access to document library 31 is web-enabled; thus adequate measures for security must be implemented for document library 31. Such means are known to those skilled in the art and may include a number of security authorization levels that are implemented at server 20 and document library server 30.

FIG. 1C is an exemplary flowchart of an embodiment of a process for accessing information captured in the system of the present invention. The method begins at step 82 where an authorized user accesses system 10 from client 50 and views a template displayed on a web page. Typically, the user navigates through a series of web page requests of category (e.g., project area of interest), sub-category (e.g., project type), etc., to reach a desired level to request information, at step 86.

In response to each of these requests for information, at step 90 server 20 queries whether the requested information is a document. If the requested information is not a document, the requested information is retrieved from database 40 at step 92. On the other hand, if the requested information is a document such as a project, associated information, including the URL address of the requested document, is retrieved from database 40 by server 20 at step 94. The URL address is then passed to client 50. At step 96, the requested project document is retrieved from document library 31 by client 50 using the URL address. Client 50 then displays the requested information to the user at step 98. Typical information requested may include organizationally-defined report templates such as project status, organization charts, and biographical information regarding people in the organization.

The following FIGS. 2–13 illustrate methods for one or more users to access and to capture information in system 10 via web page displays structured into typical organizational templates. FIGS. 2–8 illustrate exemplary methods for navigating through the business information captured in system 10, and FIGS. 9–13 illustrate methods for creating new information to be captured in system 10.

Figure 2:
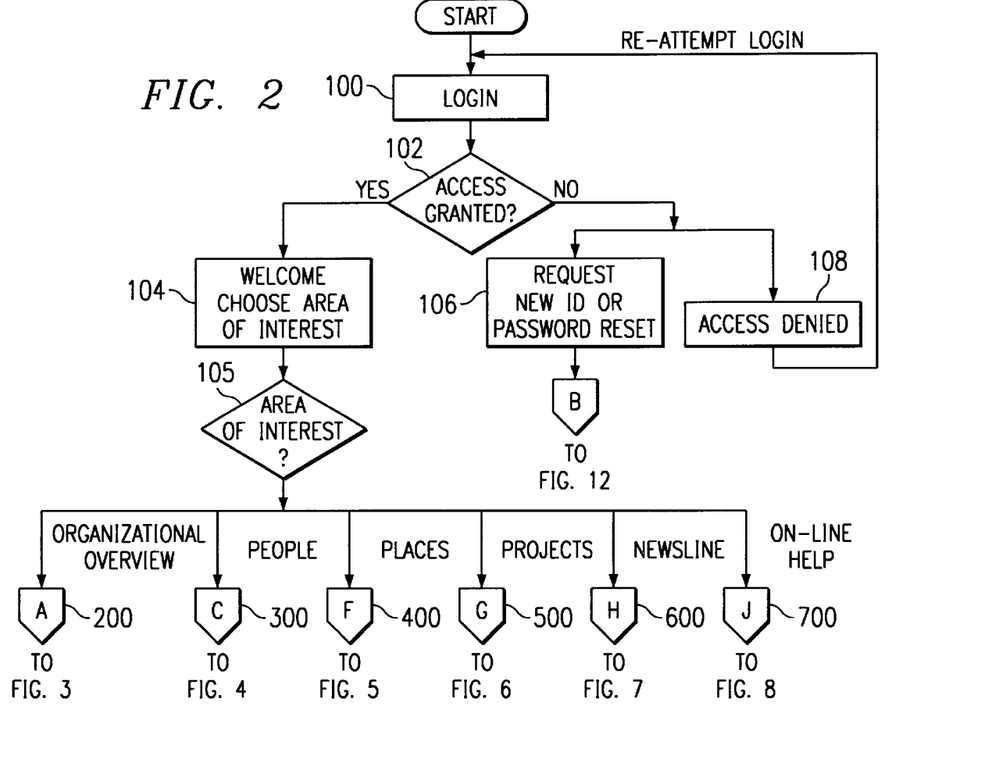
FIG. 2 is an exemplary flowchart of an embodiment of accessing the system of the present invention.

FIG. 2 is an exemplary flowchart for accessing the top-level hierarchy of an embodiment of the present invention. FIG. 2 illustrates the navigational queries for users to access captured information on a web page template displayed in browser 51 upon program initiation.

At step 100, the user accesses server 20 from client 50 using browser 51, typically via the internet. The user will be granted access to system 10 via an identification check. One such check may be through a standard login process. In this situation, a login web page template is displayed on browser 51, which permits the user to input a user ID and password. It is within the scope of the invention for such access to be granted or denied through use of, for example, an access control system. Examples of such a system include x.500 and Lightweight Directory Access Protocol (LDAP). In such an authentication and access control system, server 20 contacts a LDAP directory to verify whether the user has permission to view the requested content. If the user has not logged in prior to this, server 20 displays a login dialog box for authentication. Each time that a new page is requested, server 20 queries the LDAP directory to make sure that the user has the proper access level. Each such query to the LDAP server (not explicitly shown) after the initial query is transparent to the user. Other means of identification are also within the scope of the invention and include, for example, retinal scans, finger or thumb prints, or smartcards. In step 102, system 10 may either grant or deny access. Where system 10 grants access to the user, a Welcome Screen web page appears in step 104. The Welcome Screen displays areas of interest that the user may explore limited to the areas that the user has permission to view.

In step 105, the user selects an area of interest in this embodiment by activating a hyperlink. System 10 utilizes dynamic hyperlink capabilities to facilitate user navigation from, for example, one area of interest to another. Such methods for navigation and display in web pages, such as hyperlinking or scrolling through a list of information, are known to those skilled in the art, and may be implemented on any suitable platform or in any suitable language. Typical areas of interest include: an organizational overview 200, people 300, places 400, projects 500, newsline 600, and on-line help 700. These areas of interest are discussed in further detail and conjunction with FIGS. 3–8 respectively.

On the other hand, if system 10 does not grant access to the user in step 102, the user may re-attempt to login at system 10 at step 108, or request a new ID or to reset the password at step 106. If the user requests a new ID or to reset the password, the user proceeds to such a method for granting or denying the request at step 110. This method is discussed in FIG. 12.

Figure 3:
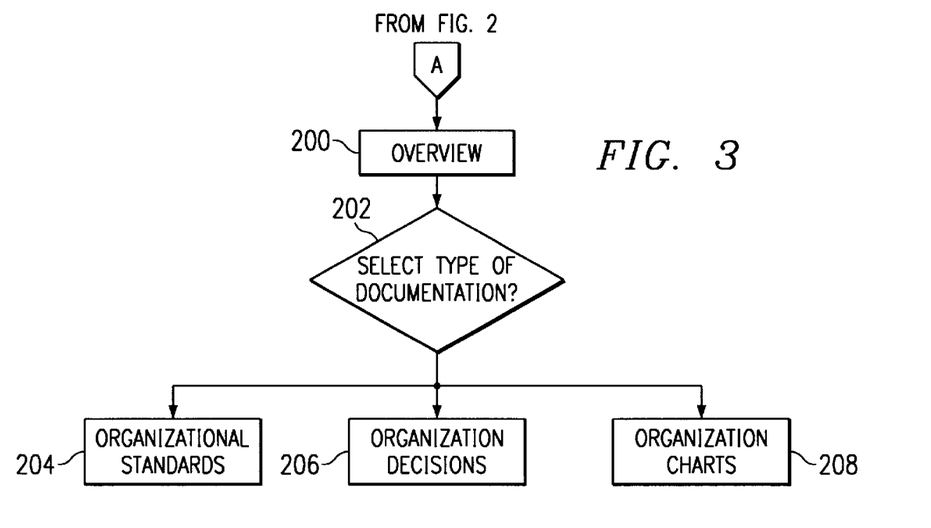
FIG. 3 is an exemplary flowchart of an embodiment of the process for selecting an organizational overview area of interest from the welcome screen according to the present invention.

FIG. 3 is an exemplary flowchart illustrating the process for selecting an organizational overview area of interest from the Welcome Screen. The method begins at step 200, where an overview web page is displayed on browser 51. The user may then select at step 202 a category of captured information to view. Typical categories of such information are organizational standards that can be explored in step 204, organization decisions in step 206, and organization charts in step 208.

Such categories may be unique to each organization. Such documents may be viewed in system 10 using various programming technologies such as Java or HTML. Such documents may be static, while others are dynamically composed. For example, organizational standards generally change less frequently, and may be effectively maintained as static documents. On the other hand, documents such as organizational charts may be more effectively maintained using dynamic methods, which mine and publish the requested information.

Figures 4, 5:
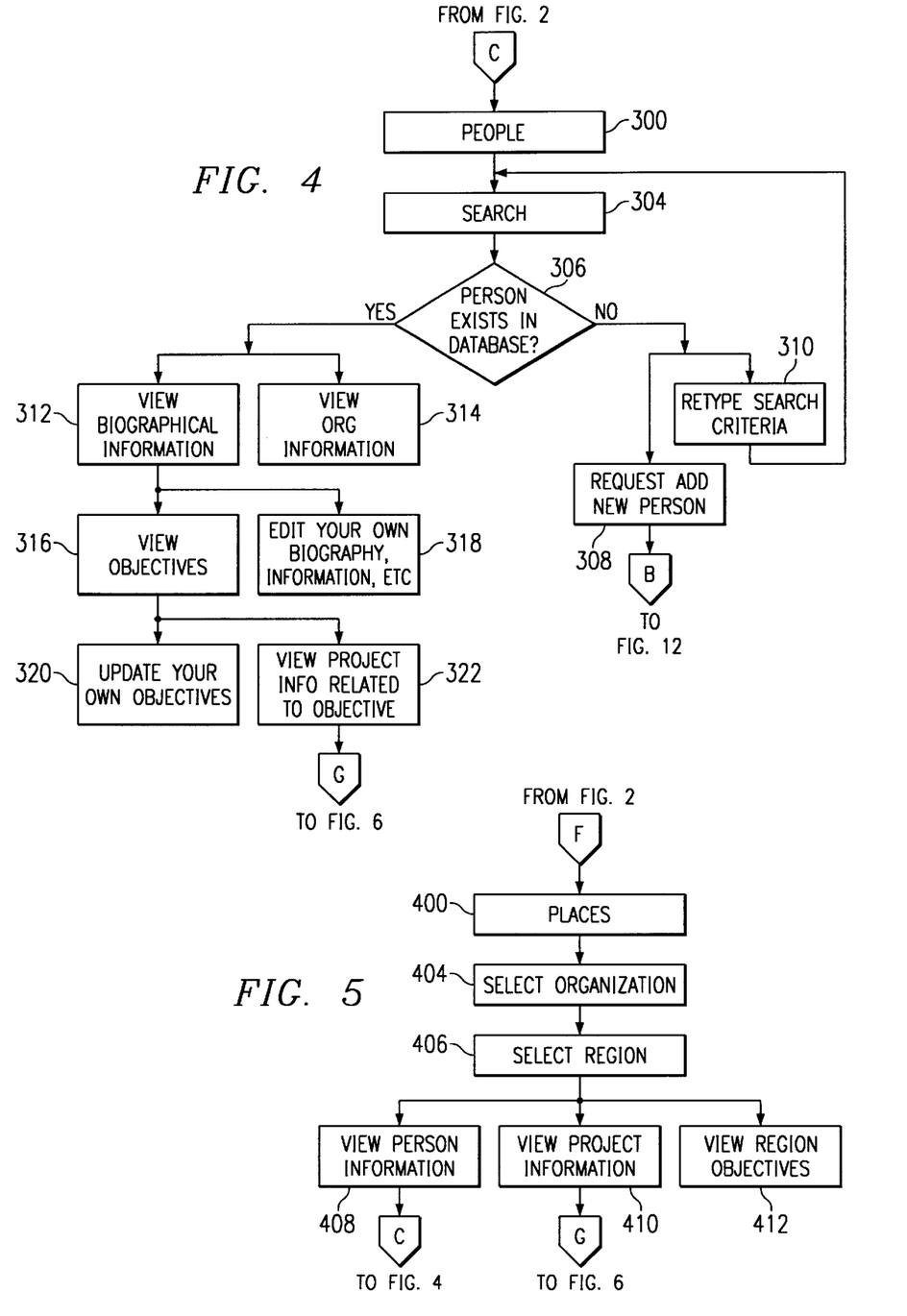
FIG. 4 is an exemplary flowchart of an embodiment of a process of selecting a people area of interest from the welcome screen according to the present invention.
FIG. 5 is an exemplary flowchart of an embodiment of a process of selecting a place area of interest from the welcome screen according to the present invention.

FIG. 4 is an exemplary flowchart for selecting a people area of interest from the Welcome Screen. The method begins at step 300 when the user is displayed at browser 51 the people page. In this embodiment, the people page displays a list, form, or entry line for the user to select or enter a desired name. In step 304, the user may search for the business information in system 10 for the selected name. In step 306, system 10 determines whether the name is located in the captured business information. If the name is not found in the captured information, the user may enter another query at step 310 and begin the search again at step 304. On the other hand, the user may at step 308 request that the system administrator add the name to system 10. The name may be added by using the method as described in FIG. 12, which begins at step 110.

Such a request to the system administrator may be implemented through a variety of processes known to those skilled in the art. For example, the user may email the system administrator for such a request. Or, system 10 may automatically notify and request the system administrator perform the function desired by the user in response to the user's selection of such a request in step 308.

On the other hand, when system 10 locates the name in the business information at step 306, the user may view on a web page displayed on browser 51 the organization information associated with the name at step 314, or can view the biographical information associated with the name at step 312. In this embodiment at step 312, a web page displays a template that allows the user the opportunity to update the biographical information. Any user may update her own biographical information at step 318.

The user may also view any objectives associated with the name at step 316. At this embodiment at step 316, a web page is displayed that permits the user to update her own objectives at step 320 and/or to view project information relating to specific objective in step 322. Viewing such project information is discussed in detail in conjunction with FIG. 6, which begins at step 500.

It is within the scope of the invention for system 10 to be partitioned in a variety of configurations known to those skilled in the art. A functional partitioning suggests that, for example, many updating and editing functions such as those performed in steps 318 and 320, invoke configuration utility 61. But in various embodiments, client 50 and server 20 may also invoke appropriate executable code for such updating and editing, without the need for a separate configuration utility 61. Such embodiments may maintain seamlessness to both system 10 and to users.

FIG. 5 is an exemplary flowchart for selecting a place area of interest from the welcome screen. The method begins at step 400, where an overview web page is displayed on browser 51. The user may then select at step 404 an organization from the captured information to view. Each organization will customize the types of organizations available to select. Typical organizations may be business subsidiaries, cost centers, such as management information systems, research and development, etc. The user may then select at step 406 a desired region. The user may then view captured information, in this embodiment arranged into one of three categories. At step 408, the user may view person information for the selected organization and region, which can be further explored in step 300, as discussed in conjunction with FIG. 4. The user may also view project information for the selected organization and region in step 410, which can be explored at step 500. Such project information is discussed in further detail in conjunction with FIG. 6. The user may also view objectives for the selected organization in the selected region, at step 412.

Figure 6:
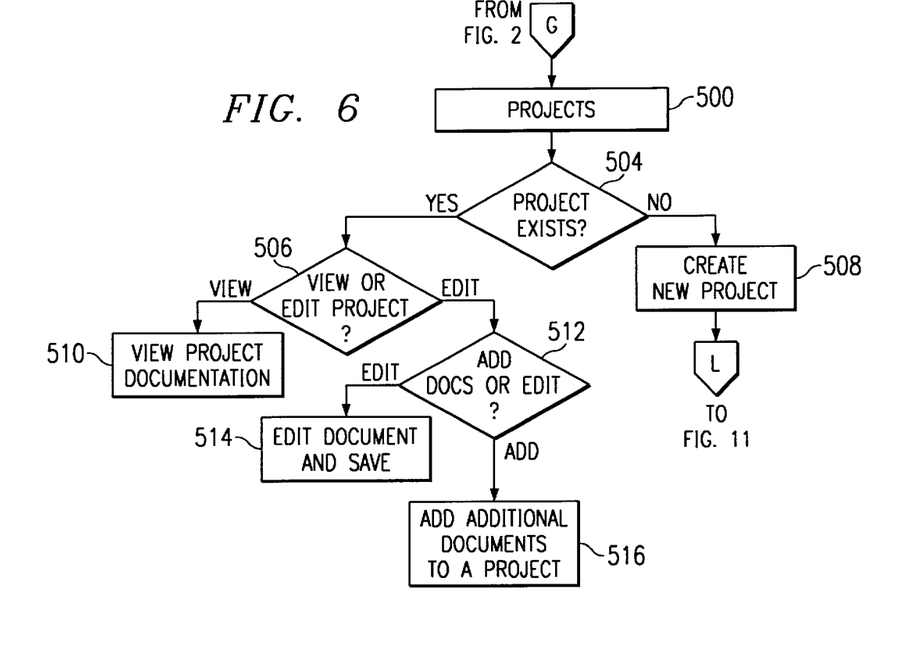
FIG. 6 is an exemplary flowchart of an embodiment of a process of selecting a project area of interest from the welcome screen according to the present invention.

FIG. 6 is an exemplary flowchart for selecting a project area of interest from the welcome screen. Most organizations desire the ability to easily access and communicate information regarding projects. Such a method enables users to do so. The method begins at step 500, where an overview web page is displayed on browser 51. The user may then select a project from the captured information to view. System 10 then determines at step 504 whether the selected project exists in the captured information in system 10. If the selected project is not in the captured information, the user may then request that the system administrator create a new project at step 508 using the document management tool.

In this embodiment, when such a new project is created, information associated with the new project is captured into document library 31. The location of the information, its URL address, is captured into database 40. In one embodiment, the project's URL address may be passed from configuration client 60 to database 40, where it is stored. Such a process is seamless to the system administrator. Creating a new project may be further explored at step 900, which is discussed in further detail in conjunction with FIG. 11.

Such a request to the system administrator may be implemented through a variety of processes known to those skilled in the art. For example, the user may email the system administrator for such a request. Or, system 10 may automatically notify and request the system administrator perform the function desired by the user in response to the user's selection of such a request in step 508. Or, system 10 can perform the request seamlessly to the user and system administrator.

If the selected project is within the captured information in system 10, system 10 retrieves the project from document library 31. The user may then view and/or edit the project in step 506 using the document management tool. By choosing to view project information, the user is displayed at step 510 a list of documents associated with the project in the document management tool. In this embodiment, document library server 30 will determine whether the user has sufficient authorization to edit the project at step 506. If so, the user may choose to add documents or to edit existing documents associated with the project at step 512 using the document management tool.

In step 514, the user may edit the list of documents associated with the project in browser 51. Such an editing process typically includes selecting a document, downloading the document to client 50 and editing and uploading the document to document library server 30. Similarly, the user may add additional documents to a project at step 516 by uploading new files to document library server 30 and storing a link to its URL address in document library 31 in database 40. Typical examples may include roles and responsibilities documents, timelines and meeting minutes. In this embodiment, system 10 typically seamlessly invokes the document management tool when a user performs steps 506–516.

Figure 7:
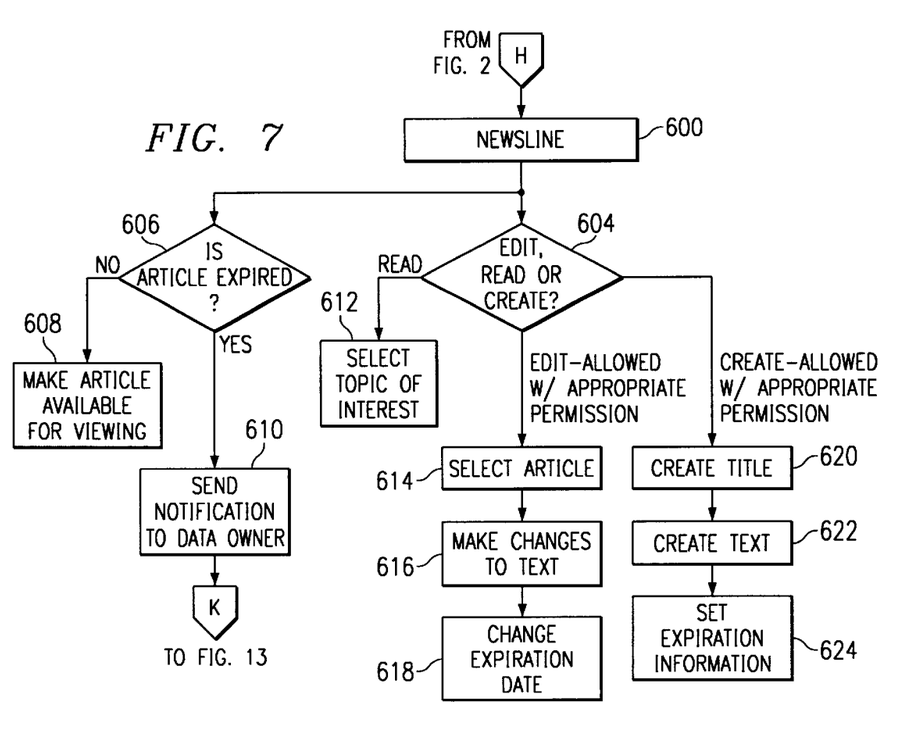
FIG. 7 is an exemplary flowchart of an embodiment of a process of selecting a news line area of interest from the welcome screen according to the present invention.

FIG. 7 is an exemplary flowchart for selecting a newsline area of interest from the welcome screen. System 10 maintains a structure for capturing information regarding articles of interest that users may submit for viewing. Such articles of interest typically include links to white papers, departmental newsletters, organizational strategic plans and links to relevant web sites.

Figure 13:
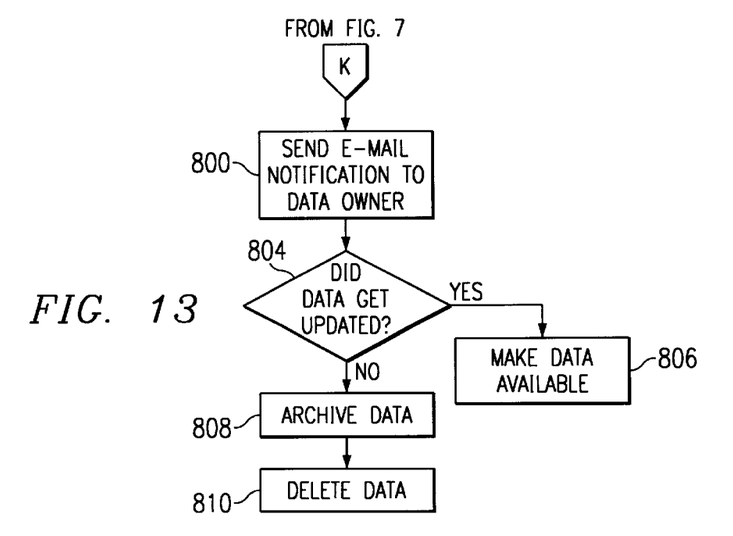
FIG. 13 is an exemplary process of an embodiment of a process of notifying a data owner of content expiration according to the present invention.

The method begins at step 600 where an overview web page is displayed on browser 51. The user may then select an article of interest. System 10 examines an expiration date associated with the article of interest in the captured information to determine whether the article has expired, at step 606. If the article has expired, system 10 will send a data of notification to the owner of such article at step 610. The method for notifying the owner of such data is explored further at step 800, in conjunction with FIG. 14. If the article has not expired, it is classified as active. System 10 makes available for viewing all active articles at step 608. System 10 may use a variety of methods known to those skilled in the art to make the articles available for viewing.

After selecting an article of interest at step 600, the user also may choose to read, edit, or create his own newsline article at step 604. The user may read an article of interest by selecting the topic of interest at step 612. The user may use a variety of methods known to those skilled in the art to select the topic of interest. Such methods include using pull-down menus and hyperlinked entries. Users with appropriate security authorization may edit or create articles of interest at step 614 and 620, respectively. To edit an article of interest, a user selects the article at step 614, makes suitable changes to the text of the article at step 616. The user may then change the expiration date at step 618 by selecting a default date, or entering an appropriate date. The user may also create a new article of interest at step 620 by first creating a title then the user creates the text of the article at step 622. Creation of such text may be performed by a variety of methods known, such as scanning an article, inserting a document, or typing in text. The user then creates an expiration date at step 624 by selecting a default date, or entering an appropriate date.

Figures 8, 9:
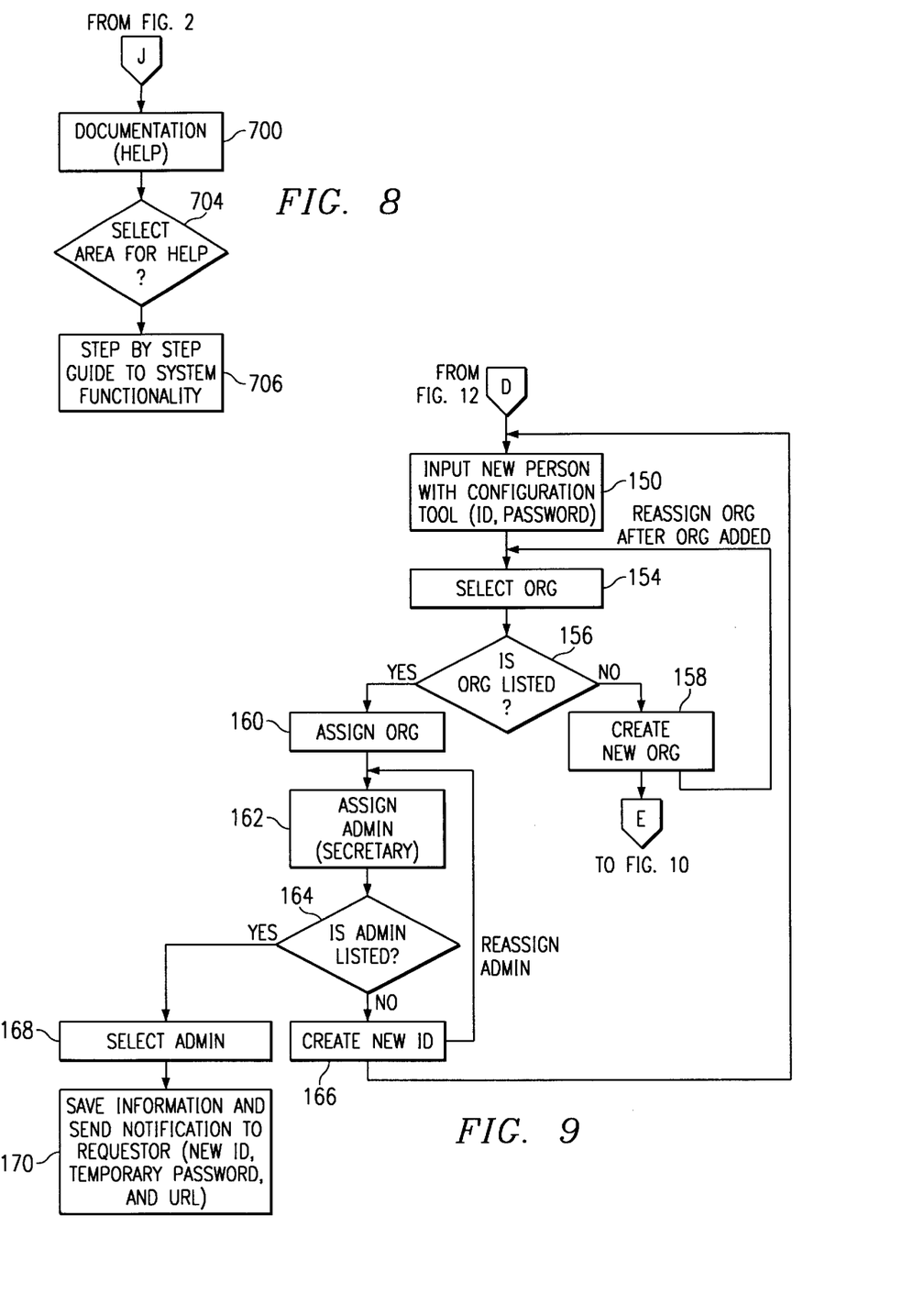
FIG. 8 is an exemplary flowchart of an embodiment of a process of providing on-line help according to the present invention.
FIG. 9 is an exemplary flowchart of an embodiment of a process of configuring a new user access according to the present invention.

FIG. 8 is an exemplary flowchart for providing on-line help. Users may select a hyperlink from any web page displayed by system 10 to receive on-line help. After selecting such a hyperlink a context sensitive, on-line documentation help screen is displayed on browser 51 at step 700. This screen displays help specific to the area of system 10 where the hyperlink was selected. The user may also select a different area of system 10 functionality for which he needs help at step 704. Such selection may be performed by a variety of methods known to those skilled in the art. For example, pull down menus, hypercards, and on-line books with internal hyperlinks may be used for such selection. Then, at step 706, system 10 displays information associated with the selected system 10 functionality.

FIGS. 9–12 are exemplary flowcharts for updating or configuring new data for capture into system 10. Configuring new data is typically performed by a user with sufficient authority to enter in new data, create new templates or documentation, or update existing entries. Such a user with system-wide authority may be an organizational system administrator who authorizes updates and maintains information consistency. Configuring new data in the embodiment shown in FIG. 1A is performed using configuration utility 61, which resides on configuration client 60. Information updates may be automated, or may involve a human being. System 10 provides suitable automatic clean-up features that provide ease of maintenance. Such features are known to those skilled in the art and include, for example, automatic delete dates to prevent data staleness. Other implementations for partitioning such system functionality are known to those skilled in the art. Configuration utility 61 may thus be integrated with other utilities residing in server 20, or be accessible to authorized users utilizing browsers 51 on client platforms 50.

FIG. 9 is an exemplary flowchart for configuring a new user access. The method begins at step 150, where a web page template is displayed on configuration utility 61. In a user with sufficient authority to use configuration client 60 may select an organization to which the user to be added belongs, at step 154. System 10 will determine whether the organization is listed at step 156. Should the organization not be listed, the authorized user may create a new organization at step 158. The method for creating a new organization is discussed in further detail in conjunction with FIG. 10, which begins at step 1000.

If the organization is listed, the authorized user then assigns the selected organization to the new user at step 160. An administrative assistant may then be assigned to the person at step 162. System 10 will then determine whether the selected administrative assistant is listed at step 164. Should the selected administrative assistant not be listed, the authorized user may create a new ID for the selected administrative assistant at step 166. Such a process for creating a new administrative assistant follows the steps to the method as described for this figure.

Should the selected administrative assistant be listed, the authorized user will select information associated with the selected administrative assistant at step 168. At step 170, the authorized user can then save the information input by steps 150–168. System 10 will then send a notification to the new user. Typical information in such a notification includes the new user's ID, temporary password and URL address.

Figures 10, 11:
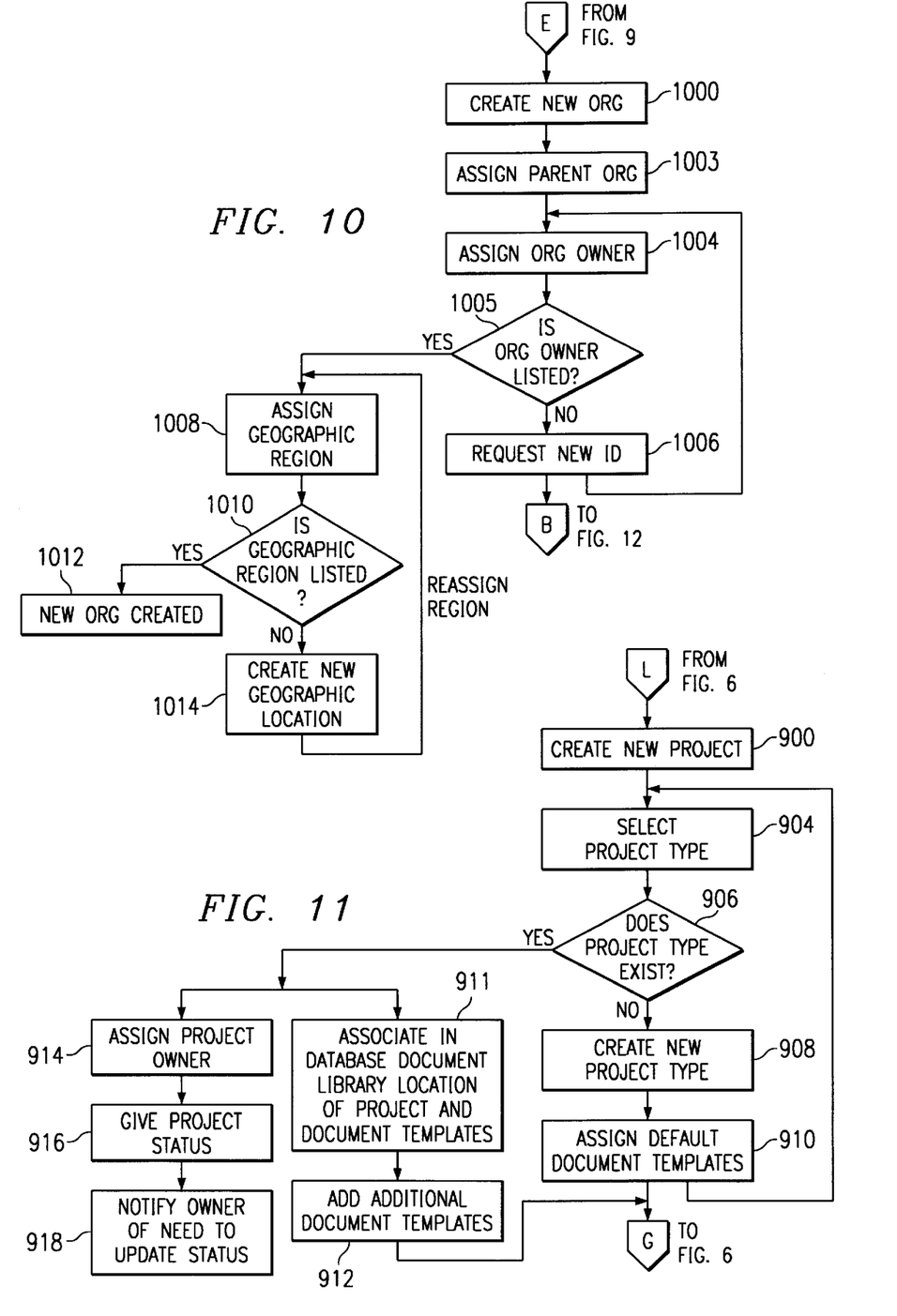
FIG. 10 is an exemplary flowchart of an embodiment of a process of configuring a new organization according to the present invention.
FIG. 11 is an exemplary flowchart of an embodiment of a process of configuring a new project according to the present invention.

FIG. 10 is an exemplary flowchart for configuring a new organization. The method begins at 1000 where an overview web page template is displayed on configuration utility 61. An authorized user may first select a parent organization at step 1003. After the parent organization has been selected, the authorized user may assign the organization owner at step 1004. System 10 will determine whether the organization is listed at step 1004. Should the organization not be listed, the authorized user must request a new ID at step 1006. The method for requesting a new ID is discussed in further detail in conjunction with FIG. 13, which begins at step 110. After such a request for the new ID for the desired organization has been completed, the user may then return to step 1004 to assign the owner of the organization. A geographic region may be selected at step 1008. System 10 will determine whether the geographic region is listed at step 1010. Should the geographic region not be listed, the user may create a new geographic region at step 1014. After creating the new geographic region, the user may then assign the geographic region to the organization at step 1008. Such assignment completes the creation of the new organization at step 1012.

FIG. 11 is an exemplary flowchart for configuring a new project. The method begins at step 900 where an overview web page template is displayed in utility 61. An authorized user selects a project type at step 904. Selection of a project type associates a default set of document templates that may be used for capturing information that is associated with the selected project type. System 10 then determines whether the project type exists at step 906. If the project type does not exist, the user must create a new project type at step 908. The user then must assign default document templates to be associated with this project type, at step 910. Creating of such documents and templates is discussed in detail in conjunction with FIG. 6, which begins at step 500. The user may then return to step 904 to select the newly created project.

If the project type does exist, system 10 will permit additional document templates to be added and to be associated with the project. In this embodiment, system 10 associates such new document templates to be added by tracking the URL address of the project and its related documents by storing the URL address in database 40, at step 911. The URL address stored in database 40 is also associated with and categorizes additional project information in database 40. Then, the authorized user may add additional document templates at step 912. Similarly, such a process follows the steps as discussed in conjunction with FIG. 6. The authorized user may also assign a project owner at step 914. Such an owner is typically responsible for maintaining certain managerial information regarding each project. Thus, as one example, each owner needs to update system 10 on the status of their respective project. Such updating is determined on an organization by organization basis. System 10 will thus determine whether the status of the project needs to be updated at step 916. If the status of the project needs to be updated, system 10 will notify the owner of such a need at step 918. Typically, such a notification will be received by the owner via an e-mail message.

It is also within the scope of the invention for system 10 to support such updating and editing on a group basis. Thus, for example, should project report status represent a compilation of inputs from a variety of users, one user may begin such a process by completing his updating or editing. System 10 may then send a notification to the other users that requests their changes and updates be made. In some embodiments, such functionality may be supplied by document library 31.

Some communications within system 10 are enabled by email utilities (e.g., to facilitate notifications of data changes to users). In some cases in this embodiment of the invention, a user may access and utilize email communications to and from system 10 without the need for a browser 51. For example, a user may utilize a client 50 that has text pager facilities for receiving wireless email communications. System 10 also uses email utilities to automatically notify users of changes and updates. Examples include those notifications sent by system 10 for informing a new user of a new ID and password, and those sent to users requesting attention as to stale or expired articles. Exemplary methods for such notifications are described in conjunction with FIGS. 12 and 13.

Figure 12:
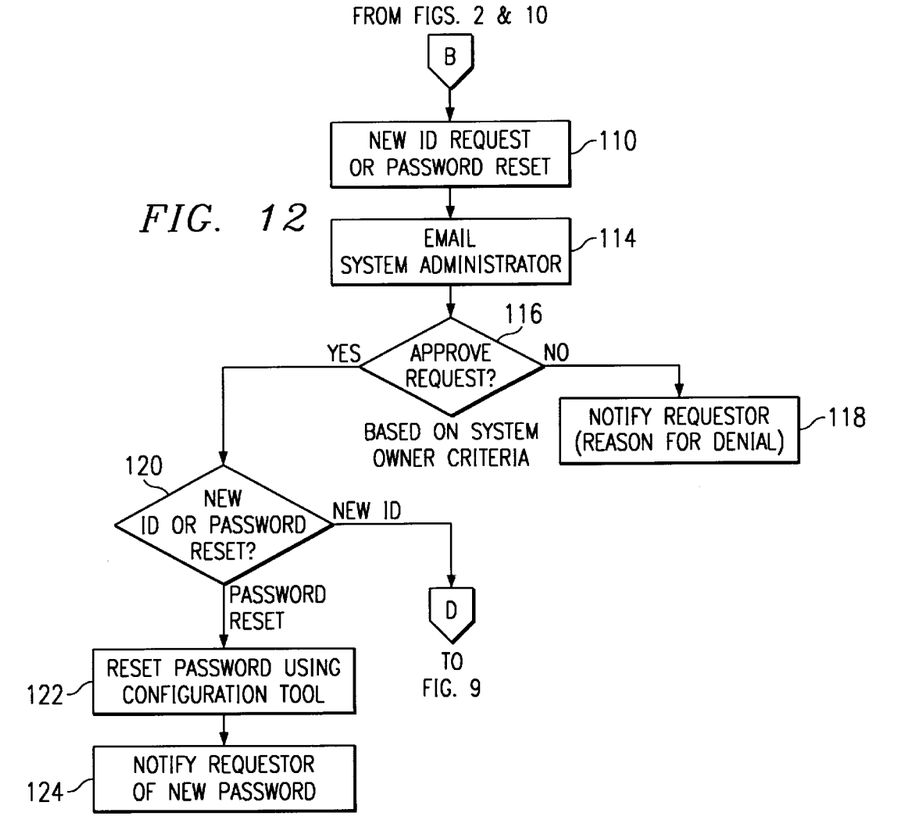
FIG. 12 is an exemplary flowchart of an embodiment of a process of requesting a new ID or password according to the present invention.

FIG. 12 is an exemplary flowchart for requesting a new ID or password. The method begins at step 110, where a user requests either a new ID or to reset the password. One embodiment for implementing such a function is by means of a hyperlink that is displayed on web browser 50 on the login page. Selection of such a hyperlink will generate a message, usually an email, to a system administrator at step 114.

The system administrator may be a utility or a human user operable to perform configuration operations such as adding new users to system 10. In this embodiment, the system administrator is a person with sufficient authority to reject or approve requests such as request for new IDs or passwords. Thus, in step 116, system administrator either rejects or accepts the request. The system administrator bases the decision on system owner criteria. System owner criteria is generally created in system 10 for each organization, to suit its needs. If the system administrator rejects the request in step 116, a notification is sent to the user in step 118. Such a notification may be generally sent by email, and states the reason for denying the request.

Should the system administrator approve the request in step 106, he must decide whether to issue a new ID or reset the password of the associated ID in step 120. The system administrator will create a new user ID by utilizing the method beginning at step 150. This method is discussed in detail in FIG. 9. On the other hand, to reset the password for the user, the system administrator will reset the password using utility 61 in step 122. Notification of the new password will be sent to the user in step 124. Such a notification may be generally sent by email, and typically includes the user's new ID and password.

FIG. 13 is an exemplary process for notifying a data owner of content expiration. The method begins at step 800, where system 10 sends a notification to an owner of data that has expired. The owner of the data may then choose to update the data, or allow it to be eventually deleted. System 10 determines whether the owner update the data, at step 804. If the data has been updated, system 10 makes the data available for viewing and saves the data, at step 806. On the other hand, if the owner did not update the data, system 10 will archive the data at step 808. System 10 will then eventually delete the data at step 810. Deletion of such data may be performed by a variety of methods known to those skilled in the art. For example, such deletion may occur after a predetermined time, via an organizationally- or system-based criterion, or upon the request of an authorized user, such as a system administrator or data owner.

System 10 automates interaction between various business tools enabling an organization to simultaneously manage business information for various aspects of a diverse business. Such a system and method are particularly advantageous in increasing the productivity of the business in its information and organizational management. The entire business organization has immediate access to the business information in a common, maintainable central repository. Such data persists as long as an organization requires and can be updated and maintained to prevent staleness problems.

It is within the scope of the invention for document library 31 to handle a variety of different business tools, such as different word processing applications. In another embodiment, system 10 may include use of templates to extract and to store content in associated information for these word processing documents. Use of templates then permits users of the organization having incompatible word processing documents to extract and update documents while maintaining consistency of information accessible across the organization. Content of documents from incompatible word processors may be stored into a suitable format such as RTF and the content transformed into the form used by the invention. The use of common templates and storage of documents permits cooperative document generation, document standardization and eliminates the need to extract and duplicate documents.

In addition to such querying of the captured information in system 10 discussed in conjunction with FIGS. 2–13, users may also want to distribute new information to others. As one example, a user may want to set a meeting date and send this information to the people associated with her on a project team. In this embodiment, users may enter such information using a web interface on browser 51. Such a web interface may be displayed to the user in a template form, or in a typical interface such as an email interface. The user may enter the meeting date, which may automatically be distributed or displayed in a banner or a web page to members of the project team.

Users may also submit feedback through a suggestion process and through logon voting regarding decision points. Such information from users may assist in upgrading or improving the configuration for system 10 in order to make system 10 more responsive in the automating of unique business information needs for the individual organization. System 10 features the capability for posting additional information such as newsletters, organizational information, and articles of general interest. As one example, such postings can be statically or dynamically bannered across the display of a web page on browser 51. For example, FIG. 7 shows one method for users to create, read, and edit such articles of interest that may be displayed or accessed by using system 10.

A streamlined method for retrieving information over the web such as used in system 10 is also particularly advantageous in that it limits the number of responses that are returned to the querying user. For example, most retrieval of information over the web uses standard search engine technologies. Such retrievals are not hierarchically-limited by configuration or focus; thus a user does not navigate through a series of queries for information. Rather, the user typically constructs a query using natural or boolean language, and is returned a large number of responses. On the other hand, such a method as used in system 10 returns an organized response that is facilitated by the organization and structure of the captured business information. This method for querying has been discussed and described in further detail in conjunction with FIGS. 2–13.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for automating the communication of business information, comprising:
    a server operable to:
        capture business information from a plurality of sources;
        capture distribution information associated with the business information;
        categorize the captured information in a standardized format;
        determine whether any of the captured information has expired; and
        display only portions of the captured information that has not expired; and
    a database operable to communicate with the server, the database operable to:
        store the captured information; and
        communicate the captured information to the server.

2. The system of claim 1, wherein the database is comprised of:
    a document library operable to store at least a portion of the captured information; and
    a general database operable to communicate to the document library and to store at least another portion of the captured information.

3. The system of claim 1, wherein the database and the server each comprise a security authorization scheme.

4. The system of claim 1, wherein the server communicates with a client.

5. The system of claim 1, further comprising a configuration client that communicates with the database and updates captured information.

6. The system of claim 1, wherein the server updates the captured information.

7. The system of claim 2, wherein the general database locates information in the document library.

8. The system of claim 1, wherein the database is a relational database.

9. The system of claim 1, wherein the standardized format comprises code to perform dynamic updates.

10. The system of claim 1, wherein the standardized format comprises a customizable template.

11. The system of claim 1, wherein the standardized format employs HTML technology.

12. The system of claim 1, wherein the server provides help to a user.

13. The system of claim 1, wherein the distribution information comprises names and email addresses for organization members.

14. The system of claim 2, wherein the general database stores a URL address associated with a location of captured information in the document library.

15. The system of claim 1, wherein the business information comprises biographical data.

16. The system of claim 1, wherein the business information comprises geographical data.

17. The system of claim 1, wherein the business information comprises project data.

18. The system of claim 1, wherein the business information comprises organizational data.

19. The system of claim 1, wherein the business information comprises digitized images.

20. A method for automating the organization of business information, comprising:
    capturing business information from a plurality of sources;
    associating distribution information associated with the business information;
    integrating the captured business and distribution information into a standardized format for access and use by a server;

storing the captured information in a database;

determining whether portions of the captured information has expired;

removing portions of the captured information that have expired from the database.

21. The method of claim 20, further comprising updating the captured business and distribution information.

22. The method of claim 20, wherein integrating the captured business and distribution information into a standardized format comprises:

identifying categories for the captured information; and relating the captured information with the categories.

23. The method of claim 20, wherein integrating the captured business and distribution information into a standardized format comprises integrating the captured business and distribution information using language to perform dynamic updates reflecting updates to captured information.

24. The method of claim 20, further comprising creating standardized templates operable to display to users and to receive information.

25. The method of claim 24, wherein creating standardized templates comprises creating templates that are unique to an organization.

26. The method of claim 20, further comprising creating security authorization levels to control access to the captured information.

27. The method of claim 20, wherein capturing business information comprises capturing spreadsheet data.

28. The method of claim 20, wherein capturing business information comprises capturing scheduling data.

29. The method of claim 20, wherein capturing business information comprises capturing email data.

30. A method for automating the use of business information, comprising:

requesting at least a portion of captured information;

determining whether the portion of captured information has expired; and receiving at a server the portion of captured information in response to the portion of captured information not being expired, the captured information received from a plurality of sources and stored in a database, the captured information being further integrated into a standardized format for access and use by the server, the captured information comprising business information and distribution information associated with the business information.

31. The method of claim 30, further comprising creating standardizing templates to display to users and to receive information.

32. The method of claim 30, further comprising:

authorizing a user to update captured information;

distributing automatically notifications regarding the updated information according to a criterion.

33. The method of claim 30, wherein receiving at a server comprises receiving at a server used by a user.

34. The method of claim 30, wherein receiving at a server comprises viewing at least a portion of the captured information in a web page.

35. The method of claim 30, wherein receiving at a server comprises:

logging into the server; and selecting at least a portion of the captured information.

36. The method of claim 35, further comprising displaying on the server banners incorporating at least a portion of the captured information.

37. The method of claim 30, further comprising dynamically updating at least a portion of the captured information with new business information to be captured.

38. The method of claim 30, further comprising displaying the portion of captured business information on a web page.

39. The method of claim 30, wherein requesting at least a portion of captured information comprises requesting at least a portion of email messages.

40. The method of claim 30, wherein requesting at least a portion of captured information comprises requesting at least a portion of spreadsheet data.

41. The method of claim 30, wherein requesting at least a portion of captured information comprises requesting at least a portion of project data.

42. The method of claim 30, wherein receiving at a server includes establishing an internet connection.

43. The method of claim 30, wherein receiving at a server comprises uplinking to a mobile device.

44. A method for automating the use of business information, comprising:

requesting at least a portion of captured information;

determining whether the portion of the captured information has expired; and accessing, from a database residing on a server, the portion of captured information in response to the portion of captured information not being expired, the captured information received from a plurality of sources and stored in a database, the captured information being further integrated into a standardized format, the captured information comprising business information and distribution information associated with the business information.

45. The method of claim 44, wherein the database comprises:

a document library operable to store at least a portion of the captured information; and a general database operable to communicate to the document library and to store at least another portion of the captured information.

46. The method of claim 44, further comprising creating standardizing templates to display to users and to receive information.

47. The method of claim 44, further comprising:

authorizing a user to update captured information;

distributing automatically notifications regarding the updated information according to a criterion.

48. The method of claim 44, wherein accessing the portion of captured information comprises accessing from the database residing on the server used by a user.

49. The method of claim 44, further comprising viewing at least a portion of the captured information in a web page.

50. The method of claim 44, wherein accessing the portion of captured information comprises:

logging into the server; and selecting at least a portion of the captured information.

51. The method of claim 49, further comprising displaying on the server banners incorporating at least a portion of the captured information.

52. The method of claim 44, further comprising dynamically updating at least a portion of the captured information with new business information to be captured.

53. The method of claim 44, wherein requesting at least a portion of captured information comprises requesting at least a portion of email messages.

54. The method of claim 44, wherein requesting at least a portion of captured information comprises requesting at least a portion of spreadsheet data.

55. The method of claim 44, wherein requesting at least a portion of captured information requesting at least a portion of project data.

56. The method of claim 44, wherein accessing the portion of captured information includes establishing an internet connection.

57. A system for automating the communication of business information, comprising:
- a database accessible via the internet, the database operable to:
  - store business information captured from a plurality of sources and distribution information associated with the business information; and
  - communicate the captured information over the internet;
- a server operable to communicate with the database over the internet, the server operable to:
  - categorize the captured information in a standardized format;
  - query the database for a hierarchically-limited portion of the captured information;
  - determining whether the hierarchically-limited portion of the captured information has expired;
  - display the hierarchically-limited portion of captured information in the standardized format in response to the hierarchically-limited portion of the captured information not being expired.

58. The system of claim 57, wherein the server uses web pages to query and to display.

59. The system of claim 57, wherein the captured information comprises documents.

60. The system of claim 57, wherein the server queries by activating a hyperlink in a web page, the web page operable to display a hierarchy of the captured information.

61. A method for automating the communication of business information, comprising:
- querying a database over the internet for a hierarchically-limited portion of captured information, the captured information comprising business information categorized with distribution information in a standardized format;
- determining whether the hierarchically-limited portion of the captured information has expired; and
- displaying on a server the hierarchically-limited portion of captured information in the standardized format in response to the hierarchically-limited portion of the captured information not being expired.

62. The method of claim 61, wherein displaying on a server comprises displaying on a web page on the server.

63. The method of claim 61, wherein querying the database comprises activating a hyperlink in a web page, the web page operable to display a hierarchy of the captured information.

* * * * *